R. REYES.
METALLIC CUSHION TIRE FOR VEHICLES
APPLICATION FILED JUNE 26, 1915.
1,233,331.
Patented July 17, 1917.
4 SHEETS—SHEET 1.
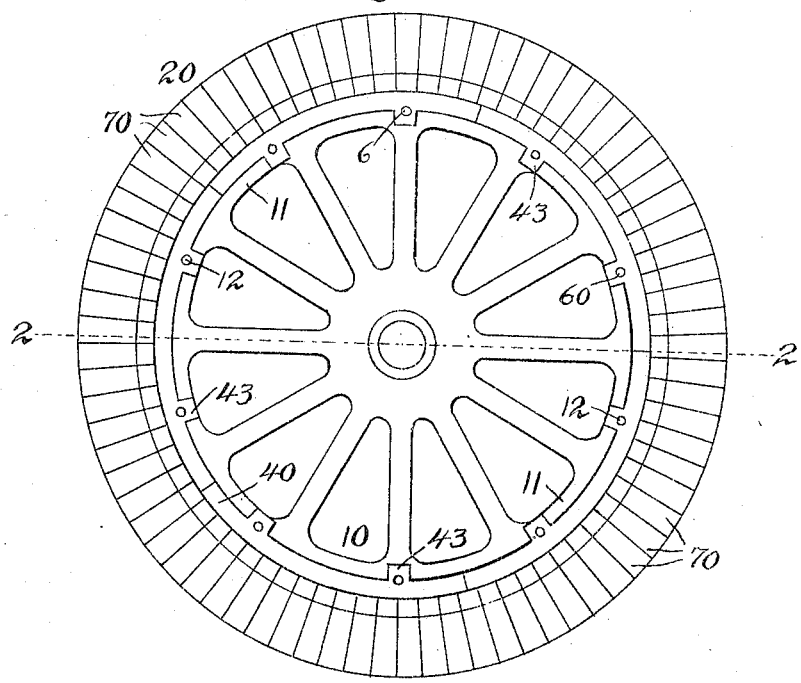
Fig. 1.
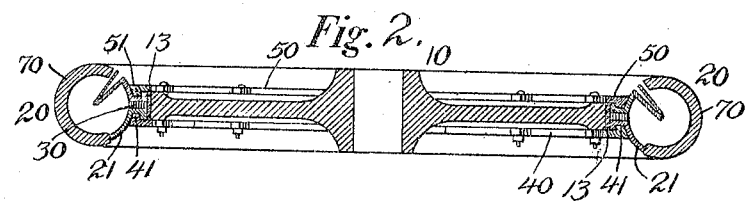
Fig. 2.
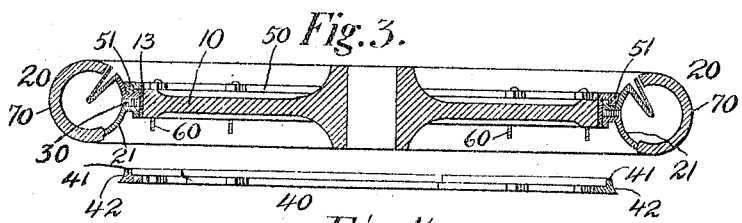
Fig. 3.
Fig. 4.
Inventor.
Ricardo Reyes

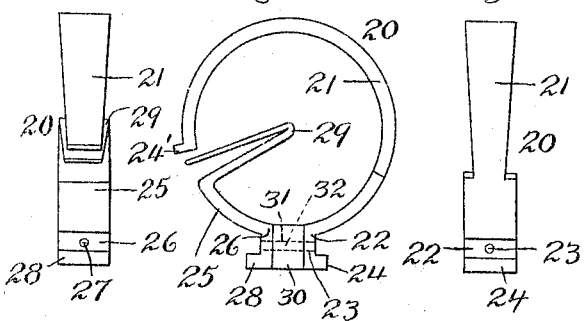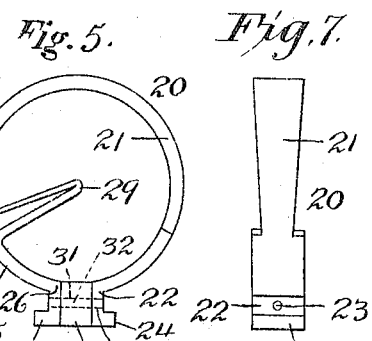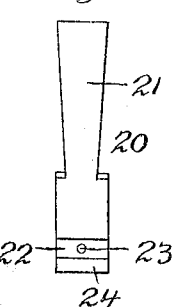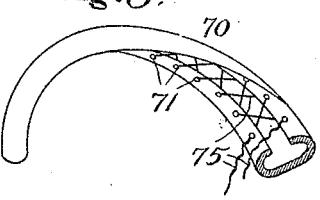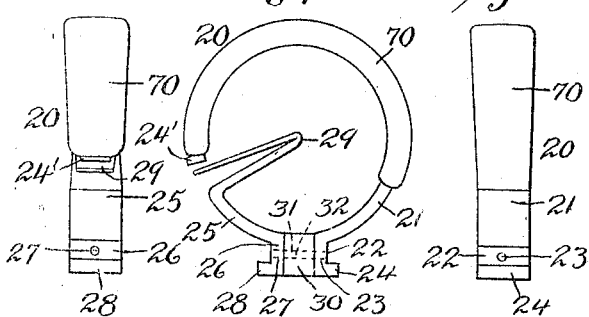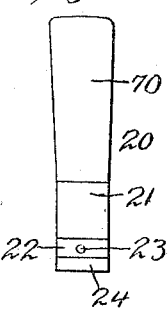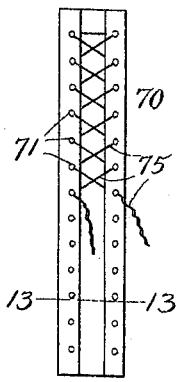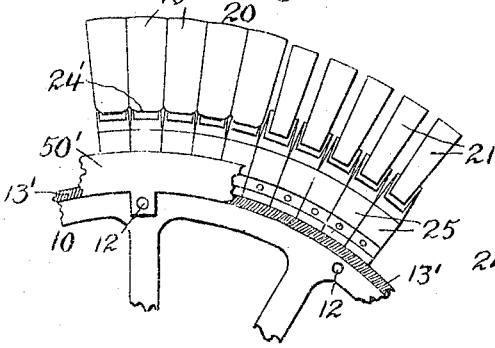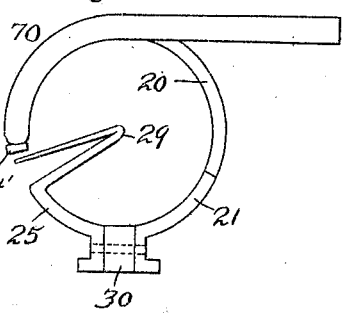

R. REYES.
METALLIC CUSHION TIRE FOR VEHICLES.
APPLICATION FILED JUNE 26, 1915.
1,233,331.
Patented July 17, 1917.
4 SHEETS—SHEET 3.
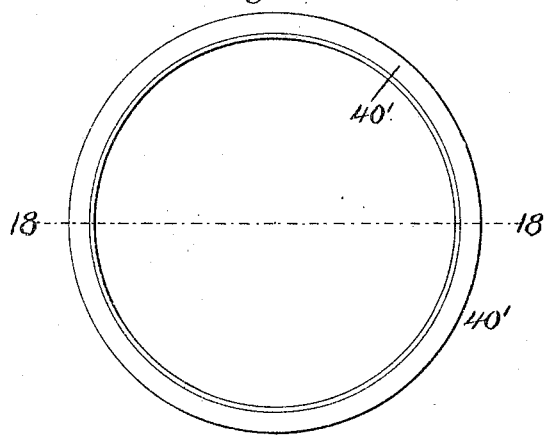
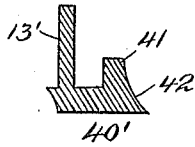
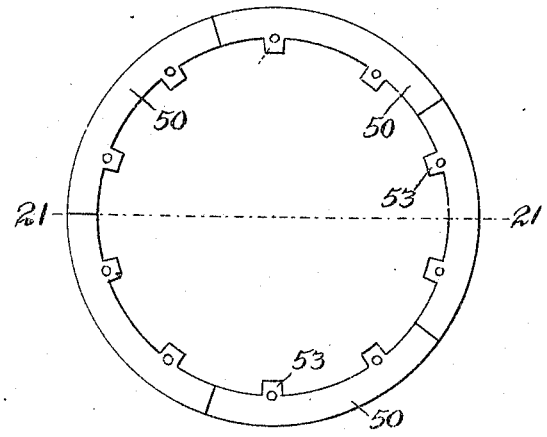

R. REYES.
METALLIC CUSHION TIRE FOR VEHICLES.
APPLICATION FILED JUNE 26, 1915.
1,233,331.
Patented July 17, 1917.
4 SHEETS—SHEET 4.
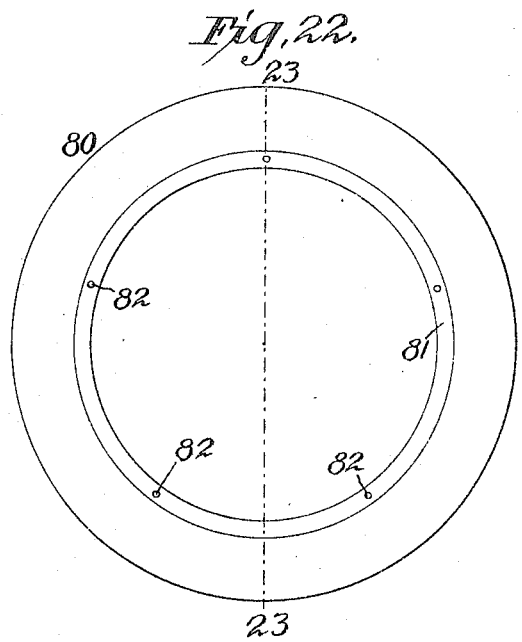
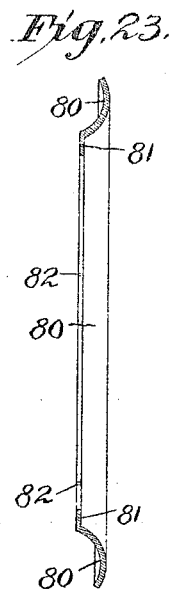
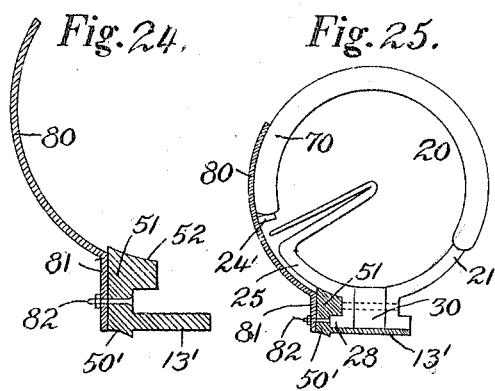
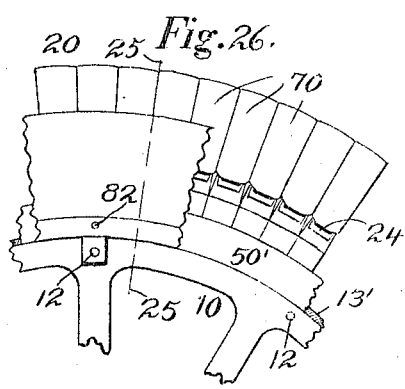

UNITED STATES PATENT OFFICE.

RICARDO REYES, OF MEXICO, MEXICO.

METALLIC CUSHION-TIRE FOR VEHICLES.

1,233,331.   Specification of Letters Patent.   Patented July 17, 1917.

Application filed June 26, 1915. Serial No. 36,586.

*To all whom it may concern:*

Be it known that I, RICARDO REYES, a resident of Mexico city, United States of Mexico, have invented certain new and useful Improvements in Metallic Cushion-Tires for Vehicles, whereof the following is a specification.

The object of the invention is to provide a steel spring tire which can be easily mounted and dismounted as a whole, in which individual parts thereof may be easily detached and replaced in repairing, and which will have the elasticity and flexibility of the pneumatic tire and avoid the use of compressed air and the weakness of the materials which form the pneumatic cushion.

Figure 1 of the accompanying drawings is a side elevation of a vehicle wheel provided with a tire containing an embodiment of this invention, Fig. 2 is a diametrical section thereof on line 2—2 of Fig. 1.

Fig. 3 is a similar section, omitting the outer clamping ring.

Fig. 4 is a diametrical section of the outer clamping ring.

Fig. 5 is an edge elevation of one of the transverse springs, whereof a circular series constitutes the body of the tire, Fig. 6 is an elevation of one side thereof, Fig. 7 is an elevation of the other side thereof.

Fig. 8 is a perspective view of an individual rubber shoe for said spring.

Fig. 9 is an edge elevation of one of said springs provided with said protecting shoe, Fig. 10 is an elevation of one side thereof, Fig. 11 is an elevation of the other side thereof.

Fig. 12 is an elevation of the inner face of a segment of the shoe.

Fig. 13 is a transverse section of said shoe on line 13—13 of Fig. 12.

Fig. 14 is a side elevation of a fragment of a wheel rim and a number of the transverse springs secured thereto, some of said springs being provided with shoes, others being without shoes, and a portion of the clamping ring being broken away.

Fig. 15 is an edge view of one of the springs showing a shoe partially removed therefrom.

Fig. 16 represents an elevation of the inner face of a one-piece outside clamping ring for the springs.

Fig. 17 represents on an enlarged scale a transverse section of said clamping ring on line 17—17 of Fig. 18.

Fig. 18 represents a diametrical section thereof on line 18—18 of Fig. 16.

Fig. 19 represents an elevation of the outer face of a segmental clamping ring for the springs, Fig. 20 represents an elevation of a segment thereof detached, Fig. 21 represents a diametrical section thereof on line 21—21 of Fig. 19.

Fig. 22 represents an elevation of the outer face of an annular protector for the tire, Fig. 23 represents a diametrical section thereof on line 23—23 of Fig. 22.

Fig. 24 represents on an enlarged scale a transverse section of one of the clamping rings and of a protector attached thereto.

Fig. 25 represents on line 25—25 of Fig. 26 a transverse section of a clamping ring having a protector attached, said section being taken between springs and showing one of the latter in elevation, the detachable clamping ring being omitted.

Fig. 26 represents a side elevation of a fragment of a wheel having the tire provided with a protector.

Similar reference numbers indicate corresponding parts in the different figures.

In the illustrated embodiment of the invention the tire is applied to a wheel 10, whereof the rim 11 is provided at intervals with lateral holes 12 and on its periphery with a metal band 13 which is flush at its opposite edges with the sides of said rim.

A circular series of elastic sheet-steel open rings 20 disposed side by side around the wheel rim in transverse relation thereto constitute the body of the tire. Each ring is composed of two sections 21 and 25. The section 21, which is the longer section, extends through three-fourths, more or less, of the circumference of the ring and the section 25 occupies about one-sixth thereof, more or less, a gap being left between the outer ends of said sections. The long section 21 is provided at its inner end with an outward attaching lug 22 having a central bolt hole 23 and a lateral lip 24, and at its outer end with a radial lip 24'. The short section 25 is provided at its inner end with an attaching lug 26 having a central bolt hole 27 and a lateral lip 28. The outer end of the section 25 is bent inward to a point at or near the center of the ring and is thence bent outward and terminates at or near the circumference thereof. These approximately radial bends form a forked V-shaped spring 29, the split end of which spans or nearly spans the gap aforesaid. A block 30 is disposed between the attaching lugs 22 and 26 of the two sections of the ring 20. This block is provided with a hole 31 which registers with the holes of said lugs and a pin, rivet or bolt 32 connects all said parts. The shanks of the sections 21 and 25 of the spring rings 20 are disposed side by side in juxtaposition but the outer parts of the sections 21 and 25 are narrower than said shanks so that spaces are left between said outer parts as shown at the right of Fig. 14. The fork 29 of the section 25 is also narrower than its shank.

Two clamping rings 40 and 50 encircle the circular series of springs 20 and engage the shanks thereof on opposite sides of the wheel. The ring 40 for the outer side of the wheel is provided with an annular inward flange 41 having a beveled or curved periphery 42. This flange fits the annular groove formed by the several lipped attaching lugs 26 of the springs 20 and the beveled curved periphery thereof fits the surface of the annular series of said springs. This clamping ring may have portions 43 which overlie one side of the rim 11.

The clamping ring 50 for the inner face of the wheel is similar in shape to the clamping ring 40, having an inward flange 51 and a beveled or curved periphery 52 and overlapping portions 53. This clamping ring 50 is preferably constructed in sections to facilitate removal and replacement. Bolts 60 passing through the clamping rings 40 and 50 and through the holes 12 of the wheel rim secure the annular series of springs 20 to said rim.

A series of individual shoes 70, composed of flexible material, are disposed on the sections 21 of the springs 20, filling the gap between said sections, and covering said sections from their outer ends on the outer side of the tire to corresponding points on the inner side thereof, and forming over the periphery a continuous sectional shoe. These individual shoes are preferably composed of strips of combined textile and rubber fabric and are provided along their opposite margins with eyelets 71. These strips are folded around the individual spring rings and secured thereon by lacing cords 75 on the undersides of said spring rings.

An annular protector is preferably employed in connection with this tire. This protector, when constructed as shown in Figs 22 to 24, consists of an annular concavo-convex guard ring 80, having an attaching flange 81 whereby it is secured by bolts 82 or otherwise to the clamping ring 50. In this position the annular skirt or body of the guard ring covers the gaps between the section of the springs 20 and prevents dust, stones, etc. from entering the tire.

Either of the clamping rings 40 or 50 may be made integral with the metal band 13. In Fig. 14 the clamping ring is indicated as integral with said band and the ring is here designated as 50' and the band as 13'. In Figs. 17 and 18 the outer clamping ring is shown as integral with said band and these parts are there marked 40' and 13' respectively.

In the use of this tire, the transverse springs 20 yield individually to the weight of the vehicle and inequalities of the road in a manner analogous to pneumatic tires. The first yielding of the springs causes the outer end of the longer section 21 to approach the outer end of the shorter section 25; further pressure brings the outer end of the section 21 in contact with the outer end of the V-shaped spring 29 and the force of the latter is added to the resistance tension of the sections. Additional pressure of sufficient force to overcome said fork spring will bring the adjacent ends of the sections 21 and 25 practically resting one on the other with the free end of the fork spring between them. Thence additional pressure on the tire will tend to compress the open rings 20 vertically and expand them laterally after the manner of pneumatic tires.

The removal of the clamping ring 50 enables the whole tire to be quickly dismounted; the removal of a section of said clamping ring enables one or more of the individual springs 20 to be quickly taken out and replaced.

I have described what I regard as the best embodiment of the invention, but I do not limit myself to this specific form, as variations may be made without departing from the spirit of the invention.

I claim as my invention:

1. A tire comprising a circular series of individual elastic sheet-steel open rings disposed side by side transversely of the tire and severally comprising two sections of different lengths individually attachable to the wheel rim, the longer section extending through more than half the circumference of the ring and the shorter section extending through less than half the circumference of the ring forming gaps at one side of the tire.

2. A tire comprising a circular series of individual elastic sheet-steel open rings disposed side by side transversely of the tire and severally comprising two sections of different lengths individually attachable to the wheel rim, the longer section extending through more than half the circumference of the ring and the shorter section extending through less than half the circumference of the ring forming gaps at one side of the tire, said open rings having auxiliary springs at said side gaps.

3. A tire comprising a circular series of individual elastic sheet-steel open rings disposed side by side transversely of the tire and severally comprising two sections of different lengths individually attachable to the wheel rim, the longer section extending through more than half the circumference of the ring and the shorter section extending through less than half the circumference of the ring forming gaps at one side of the tire, said open rings having inwardly projecting auxiliary springs integral at their fixed ends with ends of said open rings at one side of said gaps and engageable at their free ends by ends of said open rings at the other side of said gaps.

4. A tire comprising a circular series of individual elastic sheet-steel open rings disposed side by side transversely of the tire, and having auxiliary forked springs integral with said open rings at the gaps thereof.

5. A tire comprising a circular series of individual elastic sheet-steel open rings disposed side by side transversely of the tire, and having auxiliary springs at the gaps between the ends of said open rings, said auxiliary springs being in the form of forks whereof fixed tines are integral with ends of said open rings and free tines terminate in position to be engaged by the other ends of said open rings.

6. A tire comprising a circular series of individual elastic sheet-steel open rings disposed side by side transversely of the tire and having gaps exposed at one side thereof, and individual shoes of flexible material secured to said open rings and forming a sectional tread for the tire.

7. A tire comprising a circular series of individual elastic sheet-steel open rings disposed side by side transversely of the tire and severally comprising two sections of different lengths individually attachable to the wheel rim, the longer section extending through more than half the circumference of the ring and the shorter section extending through less than half the circumference of the ring forming gaps at one side of the tire, said open rings having inward radially projecting V-shaped auxiliary springs integral at their fixed ends with ends of said open rings at one side of said gaps and engageable at their free ends by ends of said open rings at the other side of said gaps.

8. A tire comprising a circular series of individual elastic sheet-steel open rings disposed side by side transversely of the tire and severally comprising two sections of different lengths individually attachable to the wheel rim, the longer section extending through more than half the circumference of the ring and the shorter section extending through less than half the circumference of the ring forming gaps at one side of the tire, said sections having attaching lugs, and blocks disposed between the lugs of the complementary sections.

9. A tire comprising a circular series of individual elastic sheet-steel open rings disposed side by side transversely of the tire, said rings being severally composed of long sections having attaching lugs and short sections having attaching lugs, and clamping rings engaging said lugs.

10. A tire comprising a circular series of individual elastic sheet-steel open rings disposed side by side transversely of the tire, said rings being severally composed of long sections having attaching lugs, short sections having attaching lugs and blocks between said lugs, and clamping rings engaging said lugs.

11. A tire comprising a circular series of individual elastic sheet-steel open rings disposed side by side transversely of the tire, said rings being severally composed of long sections having attaching lugs, short sections having attaching lugs and blocks between said lugs, and clamping rings engaging said lugs, one of said clamping rings being constructed in sections.

12. A tire comprising a circular series of individual elastic sheet-steel open rings disposed side by side transversely of the tire, said rings being severally composed of long sections having attaching lugs at their inner ends and short sections having attaching lugs at their inner ends, gaps being formed between the outer ends of said sections at one side of the wheel, means for detachably securing said rings, and a guard which covers the gaps between said sections.

In testimony whereof I affix my signature.

RICARDO REYES ELIZONDO.

Copies of this patent may be obtained for five cents each, by addressing the "Commissioner of Patents, Washington, D. C."